ates Patent [19] [11] 3,938,235
Wendt, III et al. [45] Feb. 17, 1976

[54] METHOD FOR SEVERING RINGS FROM A COIL

[75] Inventors: William H. Wendt, III, River Forest; George D. Krieps, Glenwood, both of Ill.

[73] Assignee: Chicago Metal Mfg. Co., Chicago, Ill.

[22] Filed: Oct. 17, 1974

[21] Appl. No.: 515,535

Related U.S. Application Data

[62] Division of Ser. No. 341,304, March 14, 1973, Pat. No. 3,878,654.

[52] U.S. Cl. .................. 29/412; 29/156.62; 140/88; 228/170; 228/173
[51] Int. Cl.² ......................................... B23P 17/00
[58] Field of Search ........ 29/412, 475, 156.62, 477, 29/160.6, 156.63; 140/88; 51/34 C, 34 D, 34 E, 37, 47, 227 R

[56] References Cited
UNITED STATES PATENTS

| | | | |
|---|---|---|---|
| 1,161,001 | 11/1915 | Merritt | 140/88 |
| 1,626,915 | 5/1927 | Buffington | 140/88 |
| 1,801,363 | 4/1931 | Mueller | 29/412 X |
| 2,656,594 | 10/1953 | Westling | 29/477 X |
| 2,948,322 | 8/1960 | Cox et al. | 29/156.62 X |

Primary Examiner—Victor A. DiPalma
Attorney, Agent, or Firm—Burmeister, Palmatier & Hamby

[57] ABSTRACT

A helical coil comprising a plurality of turns of bar stock is mounted on an expanding mandrel which is operated by a hydraulic cylinder or the like to expand the internal circumference of the coil against the resilient resistance thereof. A severing device is then employed to form a cut across the turns of the coil so as to sever each turn as a separate ring having a gap therein corresponding in width to the thickness of the severing device. The expanding mandrel is then released so as to allow the rings to spring back to their original circumference. In this way, the gap in each ring is closed. Each ring may then be flattened to remove the helical pitch so that the ring will be in a single plane with the severed ends of the ring aligned. The severed ends may be welded or otherwise joined. The disclosed machine preferably employs a rotary abrasive disc for forming the cut across the turns of the coil. The width of the cut corresponds to the thickness of the abrasive disc. The amount by which the coil is expanded preferably corresponds to the thickness of the abrasive disc so as to compensate for the width of the cut produced by the abrasive disc. The continuing abrasive action of the sides of the disc, as the cut progresses across the turns of the coil, prevents the disc from being pinched by the turns of the coil.

1 Claim, 8 Drawing Figures

U.S. Patent   Feb 17, 1976   3,938,235
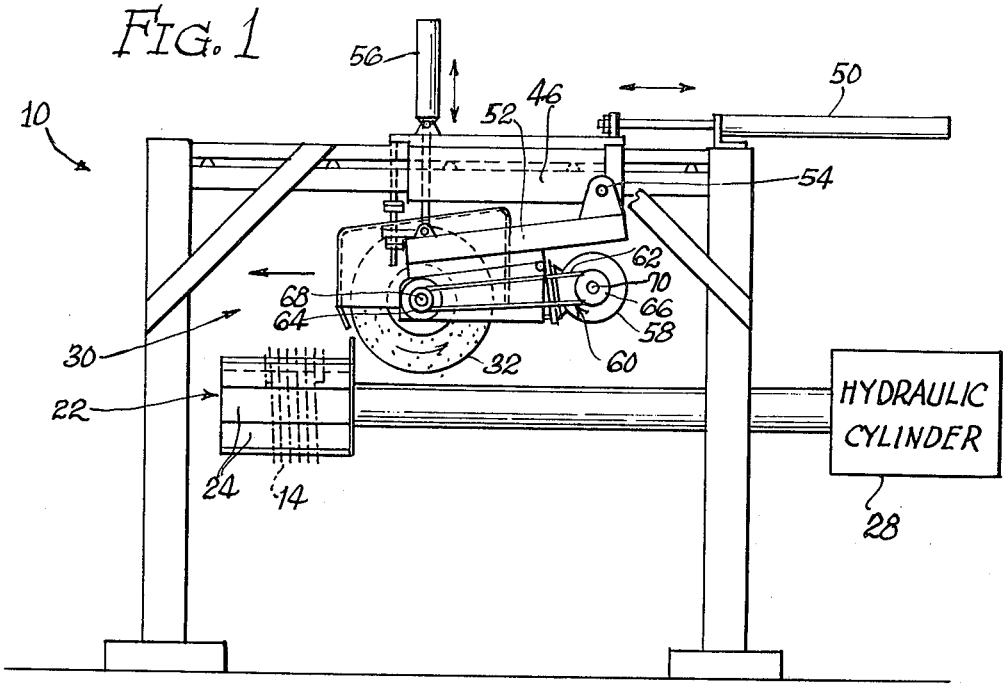
FIG. 1
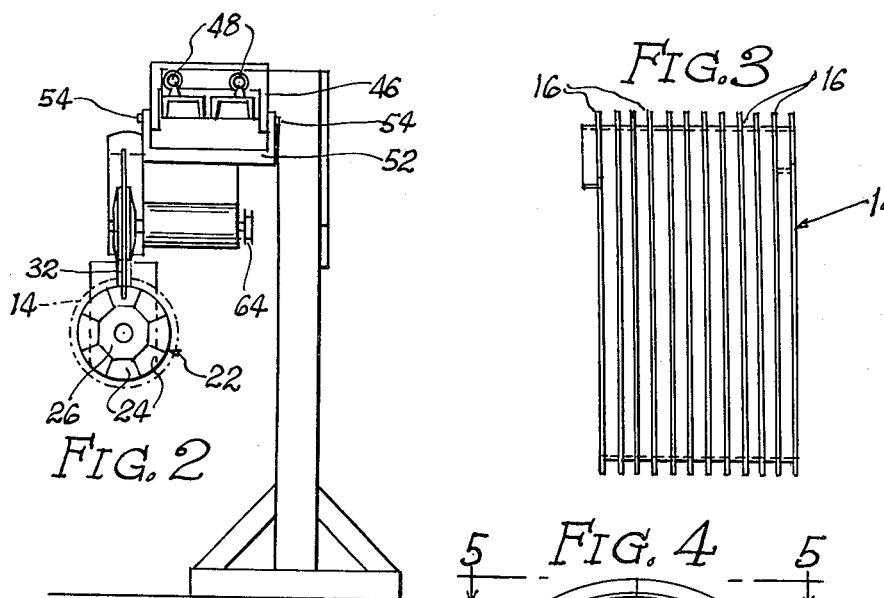
FIG. 2
FIG. 3
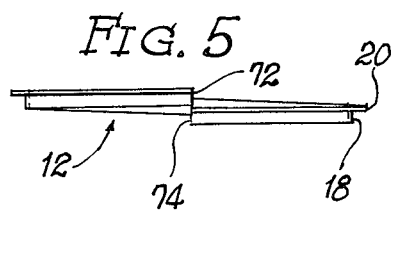
FIG. 5
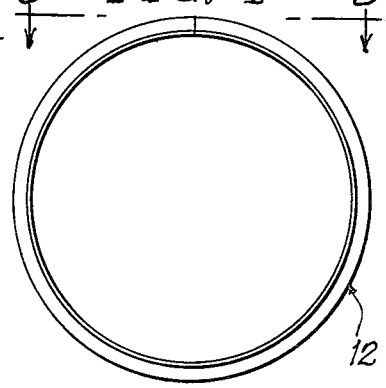
FIG. 4
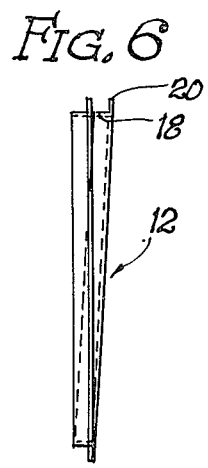
FIG. 6

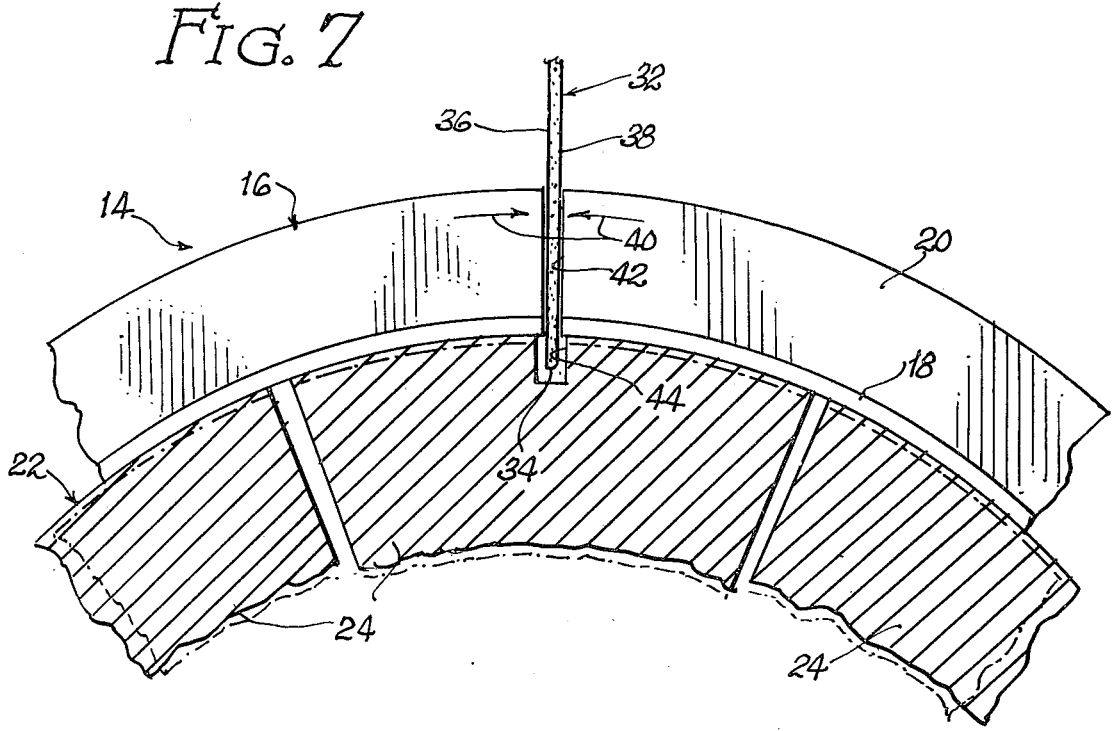
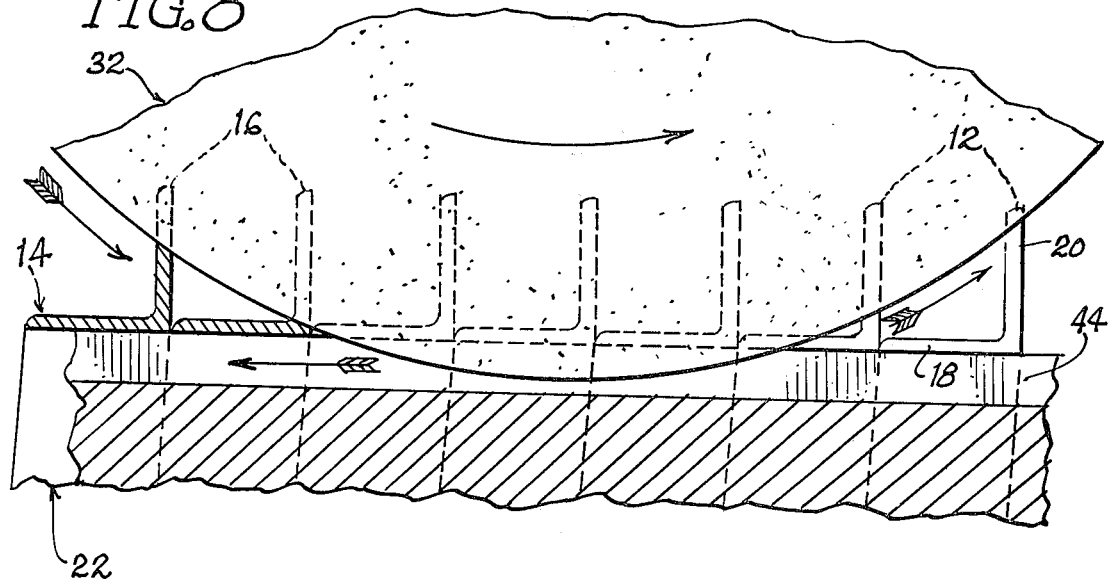

METHOD FOR SEVERING RINGS FROM A COIL

This application is a division of the applicant's copending application, Ser. No. 341,304, filed Mar. 14, 1973, now U.S. Pat. No. 3,878,654, the priority of which is claimed for this application.

This invention relates to a method and machine for forming rings by severing them from a helical coil.

The invention is particularly applicable to the production of angle rings, which are widely used to provide end flanges on pipes or other conduits. Such angle rings are L-shaped in cross section. However, the present invention may be employed to produce rings of any desired cross section, such as channel rings, or rings which are rectangular in cross section, for example.

One object of the present invention is to provide a new and improved method and machine for producing rings by severing them from a helical coil, comprising a plurality of turns formed from bar stock having the desired cross section.

A further object is to provide a new and improved method and machine for producing rings in such a manner that the gap produced by the cutting wheel or other tool, employed to sever the rings from the coil, is automatically closed after the rings have been severed.

Another object is to provide such a new and improved method and machine whereby the desired size of the rings can be closely controlled.

Thus, in accordance with the present invention, the rings are preferably severed from a helical coil comprising a plurality of turns formed from bar stock having the desired cross section. The internal circumference of the coil is preferably equal to or slightly less than the desired internal circumference of the rings.

The coil is preferably expanded by exerting force thereon against its own resilient resistance. In this way, the internal circumference of the coil is increased by a predetermined increment, which is preferably within the elastic limit of the metal employed in the coil. The coil may be expanded by mounting it around an expanding mandrel adapted to be actuated by a fluid power cylinder or some other power means.

A cut is then made across the turns of the expanded coil to sever each turn as a separate ring with a gap therein corresponding in width to the width of the cut. The force employed to expand the coil is then relaxed so as to allow return movement of each ring to its original circumference. In this way, the gap in the ring is automatically closed. The amount by which the coil is expanded is controlled so as to compensate for the width of the cut so that the gap in each ring will be closed when the ring springs back to its original circumference.

The rings may be severed by feeding a cutting member across the turns of the coil at one point along the circumference thereof. The cutting member preferably takes the form of a rotary abrasive disc or wheel having a thickness corresponding to the desired width of the cut.

As the cutting operation progresses, the abrasive sides of the disc prevent the disc from being pinched by the turns of the coil. Thus, the abrasive disc is able to complete the cut across the turns of the coil without being stalled or slowed down excessively by the pinching action which tends to be produced by the severed portions of the turns due to the stress produced in the turns by the initial expansion of the coil.

After the rings have been severed from the coil, the expanding mandrel is preferably actuated so as to reduce its diameter. In this way, the rings are released.

Each ring has a helical pitch which may be removed by flattening the ring so that it lies in a single plane, with the severed ends of the ring in alignment. The severed ends may then be welded or otherwise joined to complete the ring.

Further objects, advantages and features of the present invention will appear from the following description, taken with the accompanying drawings, in which:

FIG. 1 is a side elevational view of a machine to be described as an illustrative embodiment of the present invention.

FIG. 2 is a front elevation of the machine.

FIG. 3 is an enlarged side elevation showing a helical coil from which rings are to be severed.

FIG. 4 is a front elevation showing one of the severed rings.

FIG. 5 is a plan view showing one of the severed rings and taken generally as indicated by the line 5—5 in FIG. 4.

FIG. 6 is a side elevation of the ring of FIG. 4.

FIG. 7 is a fragmentary enlarged section taken perpendicular to the axis of the coil and showing the manner in which the rings are severed.

FIG. 8 is a fragmentary enlarged section taken generally parallel to the axis of the coil and showing the severing operation.

As just indicated, FIG. 1 illustrates a machine 10 for producing rings 12 by severing them from a helical coil 14 comprising a plurality of turns 16 of bar stock of the desired cross section. In this case, the coil 14 is wound from angle bar stock which is L-shaped in cross section so that angle rings will be produced by the machine 10.

It will be seen from FIGS. 4–6 that each angle ring 12 comprises a generally cylindrical flange 18 and an end flange 20 projecting outwardly from one end of the cylindrical flange 18. Angle rings are widely used to provide end flanges on pipes, ducts or other conduits. For such use, the cylindrical flange 18 is generally slipped around the pipe and is welded or otherwise secured to the pipe. The outwardly projecting flange 20 may then by employed to connect the pipe to another pipe, or to a flat plate or wall. It will be understood that the angle rings 12 may be made of steel or any other suitable material.

The helical coil 14 is preferably formed with an internal circumference which is equal to or slightly less than the desired internal circumference of the finished rings 12. Before the rings 12 are severed, the coil 14 preferably expanded to a greater circumference against the resilient resistance of the coil. The expansion of the coil increases its internal circumference by a predetermined increment sufficient to compensate for the width of the cut to be taken across the turns of the coil in severing each turn as a separate ring. Thus, when the expansion of the turns is released, each ring springs back to its original circumference so as to close the gap which was formed in the ring by the severing operation. It is then an easy matter to flatten the ring so as to remove its helical pitch. The severed ends of the ring are thus moved into alignment. To complete the ring, the severed ends are welded or otherwise joined.

For use in expanding the helical coil 14, the illustrated machine 10 comprises an expanding mandrel 22 for receiving and supporting the coil. The mandrel 22 also has the effect of solidly clamping the coil 14 so that it will be immobilized while the rings are being severed from the coil.

It will be understood that the expanding mandrel 22 may be of any known or suitable construction. As shown, the mandrel 22 comprises a plurality of segments 24 adapted to be expanded outwardly by one or more internal wedges 26. The force to expand the mandrel 22 is preferably provided by power means, such as the illustrated hydraulic cylinder 28. Other types of fluid power devices may be employed, if desired.

The expanding mandrel 22 is calibrated and adjusted to expand the helical coil 14 to a predetermined internal circumference which is larger than the original circumference by a predetermined increment. Such increment is chosen to compensate for the width of the cut to be taken through the turns of the coil 14.

To produce such cut so as to sever the turns of the coil 14 as separate rings, the illustrated machine 10 comprises severing means 30 utilizing a cutting member 32 preferably in the form of a rotary cutoff disc or wheel. While the disc 32 may take the form of a saw, it is preferred to employ an abrasive cutoff disc or wheel, as illustrated in FIGS. 1, 7 and 8. The abrasive disc 32 has an abrasive periphery 34, and also abrasive side surfaces 36 and 38.

As the severing operation progresses, the abrasive side surfaces 36 and 38 remove sufficient stock from the turns 16 to prevent the turns from pinching the cutoff disc 32. Such pinching tends to occur because the coil 14 is under considerable stress due to the initial expansion of the coil by the expanding mandrel 22. It will be understood that the expansion of the coil 14 produces internal compressive stresses in the outer portions of the turns 16. These compressive stresses tend to produce pinching forces as represented by the force arrows 40 in FIG. 7. However, the abrasive side surfaces 36 and 38 of the cutoff disc 32 continuously remove sufficient stock from the turns 16 to prevent the cutoff disc from binding during the severing operation.

In severing the turns 16, the cutoff disc 32 is fed so as to produce a cut 42 across all of the turns 16. Such cut preferably extends parallel to the axis of the coil 14. A slot 44 is preferably formed in the mandrel 22 to provide clearance for the cutoff disc 32.

To provide for the feeding movement of the cutoff member 32, the illustrated severing means 30 preferably comprises a carriage 46, which is slidable along guide means 48. To operate the carriage 46, the machine 10 is preferably provided with power means, such as the illustrated fluid power cylinder 50.

The cutoff wheel 32 is preferably brought into engagement with the coil 14 during the advancing movement of the carriage 46, but is moved transversely away from the coil 14 during the return movement of the carriage 46. For this purpose, a movable subcarriage 52 is preferably mounted on the main carriage 46. As shown, the subcarriage 52 is swingable about pivots 54 mounted on the main carriage 46. In this way, the cutoff disc 32 can be swung downwardly so as to engage the coil 14 during the advancing movement of the carriage 46. The subcarriage 52 can then be swung upwardly so as to raise the cutoff disc 32 away from the coil 14 during the return movement of the carriage 46. The swingable subcarriage 52 is preferably operated by power means, such as the illustrated fluid power cylinder 56 mounted on the main carriage 46.

The cutoff disc 32 is preferably rotatably mounted on the swingable subcarriage 52 and is adapted to be driven by power means, such as the illustrated motor 58 also mounted on the subcarriage 52. A suitable drive 60 is provided between the motor 58 and the cutoff disc 32. Such drive 60 may utilize a belt 62 extending around pulleys 64 and 66 on the shaft 68 of the cutoff disc 32 and the shaft 70 of the motor 58.

In operation, the helical coil 14 is slipped around the expanding mandrel 22, which is then actuated by the hydraulic cylinder 28 to increase the internal circumference of the coil to a predetermined circumference. The motor 58 is energized so as to rotate the cutoff disc 32. With the swingable subcarriage 52 in its lowered position, the fluid power cylinder 50 is actuated so as to advance the slidable carriage 46. In this way, the cutoff disc 32 is fed across the turns 16 of the coil 14 so as to form a cut of predetermined width corresponding to the thickness of the disc 32. The turns 16 of the coil 14 are thus severed as separate rings. Each ring has a gap therein corresponding to the width of the cut.

When the cut has been completed, the fluid power cylinder 56 is actuated so as to raise the swingable subcarriage 52. The cylinder 50 is then actuated so as to return the slidable carriage 46. When the swingable subcarriage 52 is raised, the cutoff disc 32 does not engage the coil 14.

To release the severed rings 12, the hydraulic cylinder 28 is operated so as to relax the expanding force exerted by the mandrel 22. The rings 12 are then returned to their original circumference by virtue of their own resilience. The gap in each ring is closed by this return movement of the ring.

The released rings 12 may readily be removed from the mandrel 22 when it has been reduced to its original size. The rings 12 have the appearance illustrated in FIGS. 4–6. Thus, each ring 12 has a helical pitch. Each ring 12 has two severed end surfaces 72 and 74. To remove the helical pitch, the rings 12 are flattened or straightened so that the surfaces 72 and 74 are in alignment. The severed ends of the rings may then be welded or otherwise joined together to complete the rings.

The amount of initial expansion of the coil 14 is regulated so as to compensate for the thickness of the cut produced by the cutoff disc 32. Thus, when the expanding force is released, the severed rings spring back so that there is no gap in any of the rings. When the rings are straightened, the severed ends of the rings will be in abutment ready to be welded or otherwise joined together.

Various other modifications, alternative constructions and equivalents may be employed as will be evident to those skilled in the art.

For example, the rotary cutoff disc or wheel 32 may be of any known or suitable construction, such as the type utilizing abrasive material mounted to a metal disc. The cutoff wheel may also be of the non-metallic type utilizing resin-bonded abrasive material.

We claim:

1. A method of forming rings of a predetermined internal circumference, comprising the steps of
coiling resilient bar stock into a resilient helical coil having a plurality of turns with an internal circumference corresponding generally to said predetermined circumference,
forcibly expanding said coil against the resilient resistance thereof to an enlarged internal circumference exceeding said predetermined circumference by a predetermined increment, forming a cut across and through the turns of said coil at one point around the circumference thereof to sever each turn as a separate ring with a gap therein equal in width to the width of said cut, said cut being formed with a substantial width which is equal to said predetermined increment, relaxing the expansion of said rings to allow return movement thereof by their own resilience to said predetermined internal circumference, said gap in each ring being closed by such return movement thereof, removing the helical pitch of each ring by flattening it into a single plane and thereby bringing the severed ends of said ring into alignment, and welding said severed ends of each ring together.

* * * * *